United States Patent
Su

(10) Patent No.: US 10,194,364 B2
(45) Date of Patent: Jan. 29, 2019

(54) METHOD OF ENHANCING TRANSMISSION OPPORTUNITY AND WIRELESS DEVICE USING THE SAME

(71) Applicant: MEDIATEK INC., Hsin-Chu (TW)

(72) Inventor: Shih-Chang Su, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 115 days.

(21) Appl. No.: 15/272,408

(22) Filed: Sep. 21, 2016

(65) Prior Publication Data

US 2017/0086117 A1 Mar. 23, 2017

Related U.S. Application Data

(60) Provisional application No. 62/222,217, filed on Sep. 23, 2015.

(51) Int. Cl.
*H04W 36/16* (2009.01)
*H04W 74/08* (2009.01)
*H04W 16/14* (2009.01)
*H04W 84/12* (2009.01)

(52) U.S. Cl.
CPC ..... *H04W 36/165* (2013.01); *H04W 74/0808* (2013.01); *H04W 16/14* (2013.01); *H04W 84/12* (2013.01)

(58) Field of Classification Search
CPC .......................... H04W 16/14; H04W 74/0808
See application file for complete search history.

(56) References Cited

U.S. PATENT DOCUMENTS

| 2002/0120740 | A1  | 8/2002  | Ho       |            |
|--------------|-----|---------|----------|------------|
| 2009/0252053 | A1* | 10/2009 | Leith    | H04W 24/10 |
|              |     |         |          | 370/252    |
| 2013/0203429 | A1* | 8/2013  | Kneckt   | H04W 72/1263 |
|              |     |         |          | 455/450    |
| 2015/0304377 | A1* | 10/2015 | Chitrakar | H04W 72/082 |
|              |     |         |          | 370/312    |
| 2015/0351128 | A1* | 12/2015 | Kim      | H04W 74/085 |
|              |     |         |          | 370/329    |
| 2016/0081010 | A1* | 3/2016  | Seok     | H04W 74/0816 |
|              |     |         |          | 370/329    |
| 2017/0208648 | A1* | 7/2017  | Choi     | H04W 4/70  |

OTHER PUBLICATIONS

Wei, Yi-Hung et al, RT-WiFi: Real-Time High-Speed Communication Protocol for Wireless Cyber-Physical Control Applications, 2013 IEEE 34th Real-Time Systems Symposium, XP032561499, Dec. 3, 2013, pp. 140-149.

* cited by examiner

*Primary Examiner* — Shukri Taha
(74) *Attorney, Agent, or Firm* — Winston Hsu

(57) ABSTRACT

A method of enhancing a transmission opportunity of a wireless device comprises sensing a wireless medium; determining an interframe space duration of the wireless device to be shorter when the wireless medium is busy; and transmitting a data frame of the wireless device after the wireless medium is idle for at least the interframe space duration. By shortening the interframe space duration, a transmission opportunity of using the wireless medium is enhanced.

20 Claims, 3 Drawing Sheets

METHOD OF ENHANCING TRANSMISSION OPPORTUNITY AND WIRELESS DEVICE USING THE SAME

CROSS REFERENCE TO RELATED APPLICATIONS

This application claims the benefit of U.S. provisional application No. 62/222,217, filed on Sep. 23, 2015 and incorporated herein by reference.

BACKGROUND

The present invention relates to a method of enhancing transmission opportunity and a wireless device using the same, and more particularly, to a method and a wireless device capable of shortening an interframe space time of the wireless device.

As a demand for wireless service increases, a bandwidth of the wireless local area network (WLAN) system is required to be wider. For example, bandwidths of the WLAN systems complied with standards of IEEE 802.11a/g are 20 MHz, bandwidths of the WEAN systems complied with standards of IEEE 802.11n are 20 MHz or 40 MHz, and bandwidths of the WEAN systems complied with standards of IEEE 802.11ac are 20, 40, 80 MHz or even 160 MHz.

From another perspective, internet of thing (IoT), which connects devices through wireless connections, is getting popular recently. The devices under IoT, expected to provide low data rate transmission and consume low power, do not require such a wide operating bandwidth. Typically, a 5 MHz (or 10 MHz) bandwidth is sufficient for the devices under IoT. In some applications, the devices under IoT may be narrowband devices, which are originally configured to operate in a narrowband system (e.g., under a standard of IEEE 802.11j), and attempt to operate in a wideband WEAN system (e.g., under a standard of one of IEEE 802.11a/b/g/n/ac). However, the wideband WEAN systems (IEEE 802.11a/b/g/n/ac) are usually not compatible with the narrow WLAN system (IEEE 802.11j).

In detail, the narrowband WLAN system and the wideband WLAN system both perform a distributed coordination function protocol (DCF) under a carrier sense multiple access with collision avoidance (CSMA/CA) mechanism. That is, devices under either the narrowband WLAN system or the wideband WLAN system have to sense a status of a wireless medium before transmission. If the devices find that the wireless medium is continuously idle for a specific duration, i.e., a DCF interframe space (DIFS) duration, the devices are allowed to transmit data. Otherwise, if the wireless medium is found busy during the DIFS duration, the devices defer their transmission. However, the DIFS duration corresponding to the narrowband WLAN system is much longer than the DIFS duration corresponding to the wideband WLAN system. In addition, a slot time, which is related to a length of a contention window of a backoff mechanism within the CSMA/CA mechanism, corresponding to the narrowband WLAN system is longer than a slot time corresponding to the wideband WLAN system as well. Hence, devices under the narrowband WLAN system would hardly obtain a chance to transmit data.

Therefore, how to enhance a transmission opportunity is a significant objective in the field.

SUMMARY

It is therefore a primary objective of the present invention to provide a method of enhancing transmission opportunity and a wireless device using the same, to improve over disadvantages of the prior art.

An embodiment of the present invention discloses a method of enhancing a transmission opportunity of a wireless device. The wireless device communicates with a second wireless system and attempts to interoperate with a first wireless system. The first wireless system is configured with a first interframe space duration. The method comprises steps of sensing a wireless medium; determining an interframe space duration of the wireless device to be shorter than a second interframe space duration specified in a standard corresponding to the second wireless system when the wireless medium is occupied by the first wireless system; and transmitting a data frame of the wireless device after the wireless medium is idle for at least the interframe space duration, wherein the data frame complies with the standard corresponding to the second wireless system.

An embodiment of the present invention further discloses a wireless device, configured to enhance a transmission opportunity. The wireless device communicates with a second wireless system and attempts to interoperate with a first wireless system. The first wireless system is configured with a first interframe space duration. The wireless device comprises a processing unit; and a storage unit, coupled to the processing unit, configured to store a program code, the program code instructing the processing unit to perform following steps: sensing a wireless medium; determining an interframe space duration of the wireless device to be shorter than a second interframe space duration specified in a standard corresponding to the second wireless system when the wireless medium is occupied by the first wireless system; and transmitting a data frame of the wireless device after the wireless medium is idle for at least the interframe space duration, wherein the data frame complies with the standard corresponding to the second wireless system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
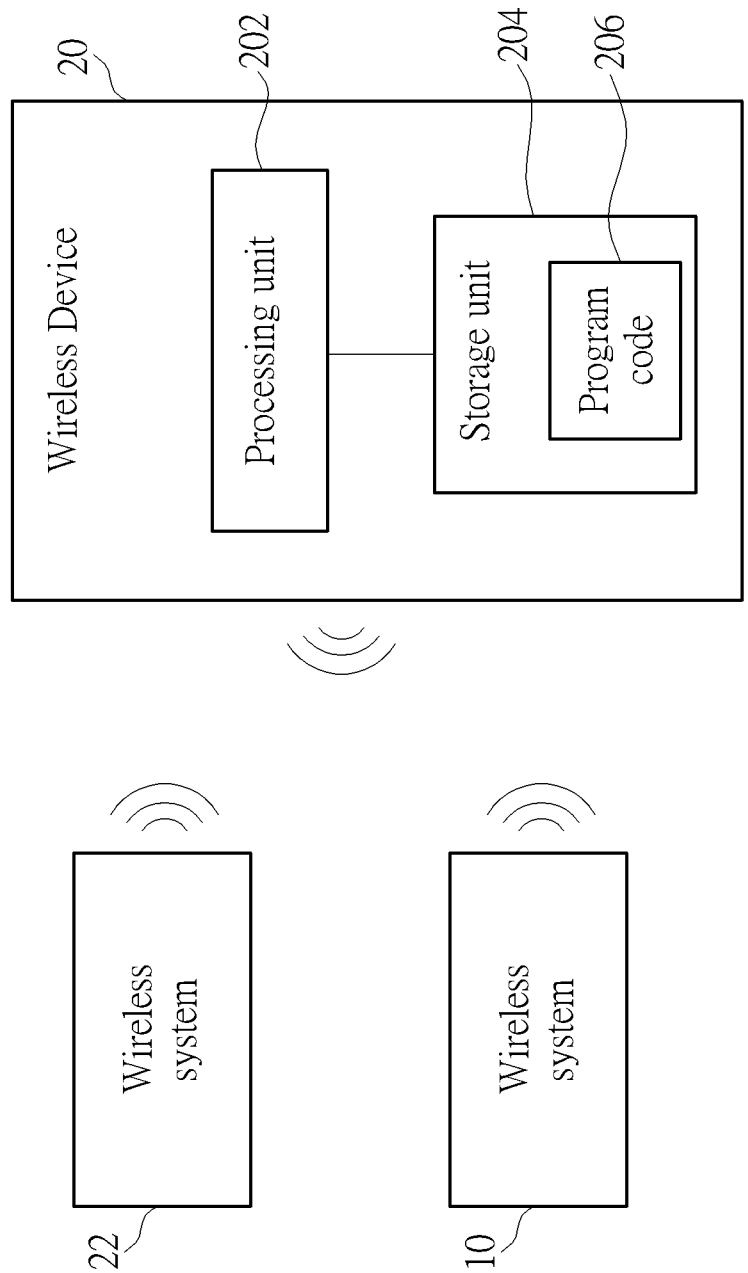
FIG. 1 is a schematic diagram of a wireless device according to an embodiment of the present invention.

Please refer to FIG. 1, which is a schematic diagram of a wireless device 20 according to an embodiment of the present invention. The wireless device 20 attempts to interoperate with a wireless system 10 which complies with a first standard, while the wireless device 20 is customized for communicating with a wireless system 22 which complies with a second standard, where the second standard is different from the first standard. According to the first standard and the second standard, the wireless system 10 operates within a first bandwidth, and the wireless system 22 operates within a second bandwidth, where the second bandwidth may be narrower than the first bandwidth. The wireless device 20 comprises a processing unit 202 and a storage unit 204. The storage unit 204 is coupled to the processing unit 202 and configured to store a program code 206, where the program code 206 instructs the processing unit 202 to execute a process for the wireless device 20 to enhance a transmission opportunity during operations of the wireless system 10. However, according to another embodiment of the present invention, the wireless device 20 can be two separate wireless devices wherein one of the two separate devices communicates with the wireless system 10 with the first standard, while the other one of the two separate devices communicates with the wireless system 22 with the second standard. The two separate wireless devices are located in a neighborhood.

Notably, even if the first standard and the second standard are different, both the first standard and the second standard perform a distributed coordination function protocol (DCF) under a carrier sense multiple access with collision avoidance (CSMA/CA) mechanism, which means that the wireless device 20 performs the DCF under the CSMA/CA mechanism. In other words, the wireless device 20 would wait until a wireless medium is idle for a DCF interframe space (DIFS) duration plus a backoff period and then perform data transmission, where the DIFS duration is a short interframe space (SIFS) duration plus two slot times. Nevertheless, according to the first standard and the second standard, the wireless system 10 is configured with a first DIFS duration DIS_1, and the wireless system 22 is configured with a second DIFS duration DIS_2, where the second DIFS duration DIS_2 is much longer than the first DIFS duration DIS_1.

To be more specific, when the first standard can be IEEE 802.11a, the first DIFS duration DIS_1 is 34 microseconds, which includes a first SIFS duration SIS_1 specified to be 16 microseconds and a first slot time SLT_1 specified to be 9 microseconds. On the other hand, when the second standard can be IEEE 802.11j, the second DIFS duration DIS_2 is 106 microseconds, which includes a second SIFS duration SIS_2 specified to be 64 microseconds and a second slot time SLT_2 specified to be 21 microseconds. Note that, the second slot time SLT_2 is longer than the first slot time SLT_1 as well.

If the wireless device 20 simply complies with the second standard, which means that a DIFS duration DIS_x corresponding to the wireless device 20 is equal to the second DIFS duration DIS_2, the wireless system 10 would easily obtain a transmission opportunity of using the wireless medium to transmit data (since the first DIFS duration DIS_1 is shorter than the second DIFS duration DIS_2), such that the wireless device 20 would hardly obtain a chance to transmit data.

To enhance a transmission opportunity during operations of the wireless system 10, the wireless device 20 determines the DIFS duration DIS_x to be shorter than the second DIFS duration DIS_2. That is, the wireless device 20 no longer simply complies with the second standard. Instead, the wireless device 20 shortens the DIFS duration thereof, compared to the second DIFS duration DIS_2, while a data frame transmitted from the wireless device 20 remains under the second standard. In addition, the DIFS duration DIS_x is a SIFS duration SIS_x of the wireless device 20 plus twice of a slot time SLT_x of the wireless device 20, i.e., DIS_x=SIS_x+2*SLT_x.

Figure 2:
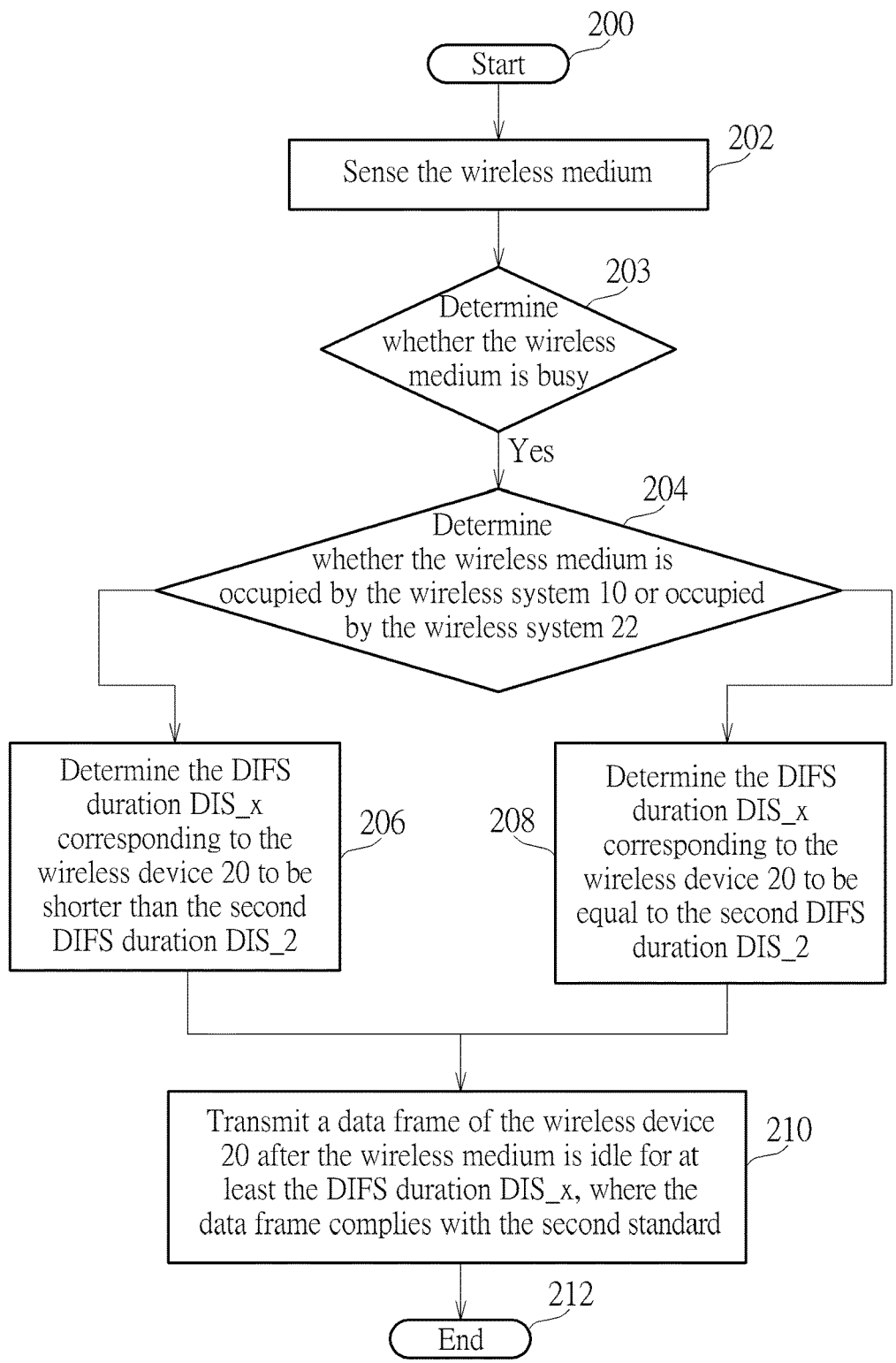
FIG. 2 is a schematic diagram of a process according to an embodiment of the present invention.

Please refer to FIG. 2, which is a schematic diagram of a process according to an embodiment of the present invention. The process 30 may be compiled as the program code 206 stored in the storage unit 204 and executed by the processing unit 202. The process 30 comprises following steps:

Step 200: Start.
Step 202: Sense the wireless medium.
Step 203: Determine whether the wireless medium is busy. If yes, go to Step 204.
Step 204: Determine whether the wireless medium is occupied by the wireless system 10 or occupied by the wireless system 22. If the wireless medium is occupied by the wireless system 10, go to Step 206. If the wireless medium is occupied by the wireless system 22, go to Step 208.
Step 206: Determine the DIFS duration DIS_x corresponding to the wireless device 20 to be shorter than the second DIFS duration DIS_2.
Step 208: Determine the DIFS duration DIS_x corresponding to the wireless device 20 to be equal to the second DIFS duration DIS_2.
Step 210: Transmit a data frame of the wireless device 20 after the wireless medium is idle for at least the DIFS duration DIS_x, where the data frame complies with the second standard.
Step 212: End.

According to the process 20, the wireless device 20 shortens the DIFS duration DIS_x, which enhances the transmission opportunity during operations of the wireless system 10. Specifically, in Step 202, the wireless device 20 senses the wireless medium to determine whether the wireless medium is idle or busy (occupied). Details of sensing the wireless medium to determine whether or not the wireless medium is busy is known by one skilled in the art, which is not narrated herein for brevity.

When the wireless medium is busy, in Step 204, the wireless device 20 determines whether the wireless medium is occupied by the wireless system 10 or occupied by the wireless system 22. The wireless device 20 may try to recognize signals on the wireless medium. If the wireless device 20 finds that the signals on the wireless medium is recognizable by the wireless device 20, it represents that the wireless medium is occupied by the wireless system 22, since the wireless system 22 complies with the second standard. Otherwise, if the wireless device 20 finds that the signals on the wireless medium is not recognizable by the wireless device 20, it represents that the wireless medium is occupied by the wireless system 10.

In Step 206, the wireless device 20 determines the DIFS duration DIS_x corresponding to the wireless device 20 to be shorter than the second DIFS duration DIS_2 when the wireless medium is occupied by the wireless system 10. The wireless medium occupied by the wireless system 10 represents that the wireless system 10 already obtains a transmission opportunity of occupying the wireless medium for transmission. It would be fair to release some of the transmission opportunity. Hence, the wireless device 20 may gain some of the transmission opportunity of using the wireless medium by shortening the DIFS duration DIS_x, in comparison to the second DIFS duration DIS_2. In an embodiment, the wireless device 20 may determine the SIFS duration SIS_x of the wireless device 20 to be the first SIFS duration SIS_1 and the slot time SLT_x of the wireless device 20 to be the second slot time SLT_2, i.e., DIS_x=SIS_1+2*SLT_2, such that the DIFS duration DIS_x is shorter than the second DIFS duration DIS_2. In an embodiment, the wireless device 20 may determine the slot time SLT_x of the wireless device 20 to be the first slot time SLT_1 and the SIFS duration SIS_x of the wireless device 20 to be the second SIFS duration SIS_2, i.e., DIS_x=SIS_2+2*SLT_1, such that the DIFS duration DIS_x is shorter than the second DIFS duration DIS_2. Preferably, the wireless device 20 may determine the DIFS duration DIS_x to be equal to the first DIFS duration DIS_1. In other words, the wireless device 20 may determine the SIFS duration SIS_x of the wireless device 20 to be the first SIFS duration SIS_1 and the slot time SLT_x of the wireless device 20 to be the first slot time SLT_1, i.e., DIS_x=SIS_1+2*SLT_1=DIS_1, such that the DIFS duration DIS_x is equal to the first DIFS duration DIS_1 and shorter than the second DIFS duration DIS_2.

On the other hand, when the wireless medium is occupied by the wireless system 22, in Step 208, the wireless device 20 determines the DIFS duration DIS_x corresponding to the wireless device 20 to be equal to the second DIFS duration DIS_2. The wireless medium occupied by the wireless system 22 represents that the wireless system 22 already obtains the transmission opportunity of occupying the wireless medium for transmission. The wireless device 20 does not have to be such aggressive to gain the transmission opportunity of using the wireless medium. Hence, the wireless device 20 may remain the DIFS duration DIS_x to be equal to the second DIFS duration DIS_2 as specified in the second standard.

In step 210, the wireless device 20 transmits the data frame after the wireless medium is idle for at least the DIFS duration DIS_x. The data frame complies with the second standard such that the data frame is readable/recognized by the wireless system 22. In addition, the wireless device 20 may enter a backoff mechanism, i.e., the wireless device 20 may wait for the DIFS duration DIS_x plus a backoff period BF_x and then perform data transmission after the backoff period BF_x is due, where the backoff period BF_x is a random number times the slot time SLT_x, and the slot time SLT_x may be the second slot time SLT_2 for complying with the second standard. The backoff mechanism is known by one skilled in the art, and not narrated herein for brevity. In short, the wireless device 20 transmits the data frame when the wireless medium is idle for at least the DIFS duration DIS_x.

Figure 3:
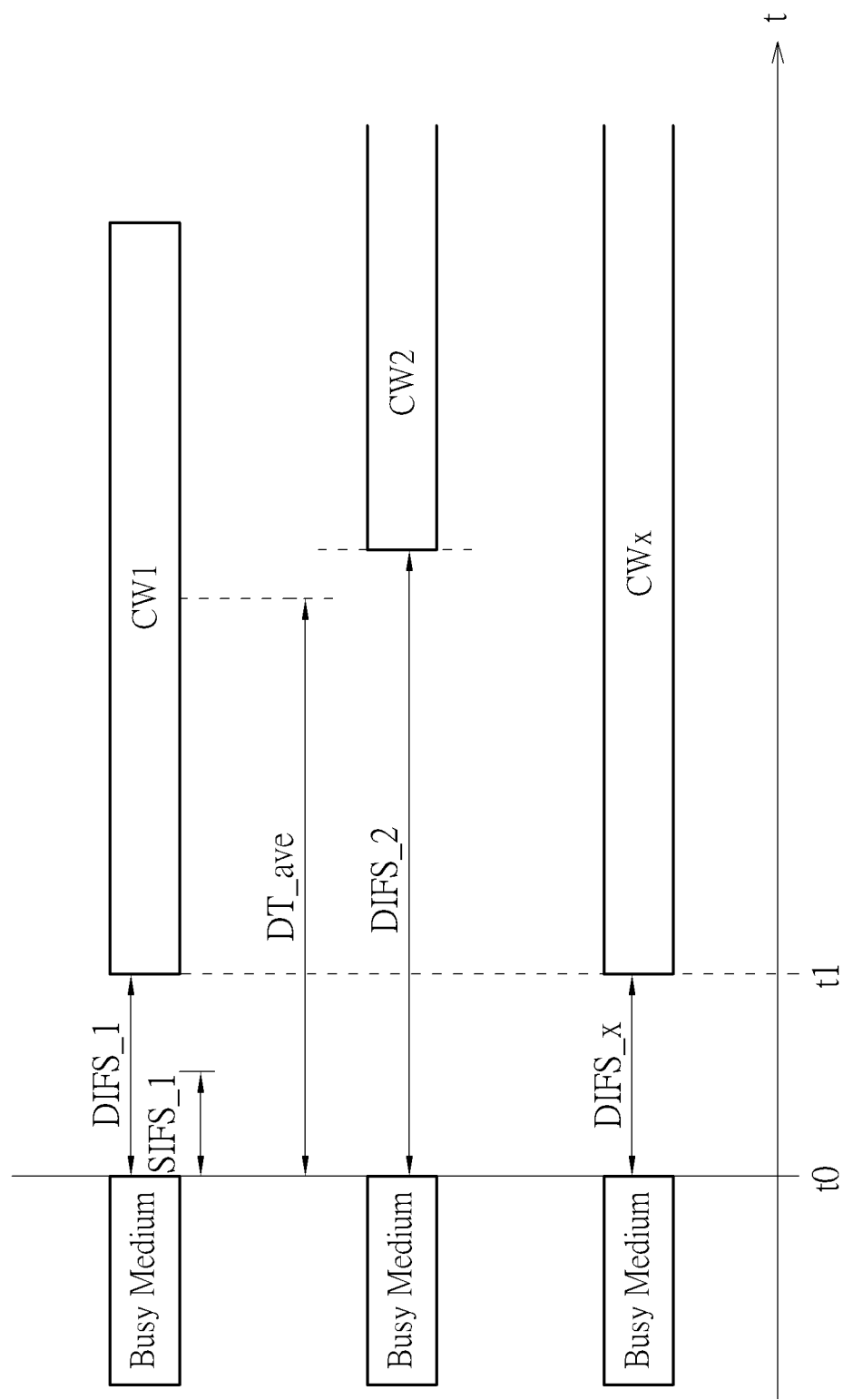
FIG. 3 is a timing diagram of the wireless device of FIG. 1 accessing a wireless medium according to an embodiment of the present invention.

Please refer to FIG. 3, which is a timing diagram of the wireless system 10 and the wireless device 20 accessing the wireless medium according to embodiments of the present invention. As shown in FIG. 3, at a time t0, the wireless medium changes from a busy status to an idle status. A first device within the wireless system 10 complying with the first standard waits for the first DIFS duration DIS_1 and may perform data transmission during a first contention window CW1. Meanwhile, a second device simply complying with the second standard waits for the second DIFS duration DIS_2 and may perform data transmission during a second contention window CW2. Once the first device contends and obtains the transmission opportunity, the second device is not allowed to transmit data.

Notably, the second DIFS duration DIS_2 is even longer than an average deferring time DT_ave of the first device within the system 10. The average deferring time DT_ave is the first DIFS duration DIS_1 plus an average backoff number times the first slot time SLT_1. The average backoff number may be 7.5 given that a length of the first contention window CW1 is 15 times the first slot time SLT_1. Hence, the second DIFS duration DIS_2 (106 microseconds) is longer than the average deferring time DT_ave (DT_ave=DIS_1+7.5*SLT_1=101.5 microseconds). Therefore, the first device within the wireless system 10 would be very likely to obtain the transmission opportunity of using the wireless medium and the second device simply complying the second standard would hardly have a chance to transmit data.

On the other hand, the wireless device 20 determines the DIFS duration DIS_x corresponding to the wireless device 20 to be shorter than the second DIFS duration DIS_2, and the wireless device 20 may perform data transmission during a contention window CWx. Preferably, the DIFS duration DIS_x may be equal to the first DIFS duration DIS_1, and thus, the wireless device may have a fair contention starting point (i.e., a time t1) with the first device. Therefore, the wireless device 20 would gain more chances to gain the transmission opportunity of using the wireless medium, compared to the second device.

Notably, the embodiments stated in the above are utilized for illustrating the concept of the present invention. Those skilled in the art may make modifications and alternations accordingly, and not limited herein. For example, the first standard is not limited to IEEE 802.11a. The first standard may be one of IEEE 802.11b/g/n/ac, which is within the scope of the present invention. In addition, in the process 30, the wireless device 20 determines the DIFS duration DIS_x to be shorter than the second DIFS duration DIS_2 when the wireless medium is occupied by the wireless system 10, which is not limited herein. In an embodiment, the wireless device 20 may determine the DIFS duration DIS_x to be shorter than the second DIFS duration DIS_2 when the wireless medium is busy, which is within the scope of the present invention.

In addition, details of determining whether the wireless medium is occupied by the wireless system 10 or occupied by the wireless system 22 is not limited. In an embodiment, the wireless device 20 may determine that the wireless medium is occupied by the wireless system 10 or by the wireless system 22 according to a physical layer information, where the physical layer information may be a fast Fourier transform (FFT) related information. Specifically, when both the wireless system 10 and the wireless system 22 employ an orthogonal frequency division multiplexing (OFDM) technique to transmit wireless signals, a subcarrier spacing corresponding to the wireless system 10 is larger than a subcarrier spacing corresponding to the wireless system 22, since the first bandwidth is wider than the second bandwidth. Hence, a fast Fourier transform period corresponding to the wireless system 10 is shorter than an FFT period corresponding to the wireless system 22. Therefore, the FFT period may be used to determine whether the wireless medium is occupied by the wireless system 10 or by the wireless system 22.

In summary, the wireless device determines the interframe space duration to be shorter than the one specified in the second standard when the wireless medium is busy, so as to gain more transmission opportunity to transmit the data frame which complies with the second standard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of enhancing a transmission opportunity of a wireless device, wherein the wireless device communicates with a second wireless system and attempts to interoperate with a first wireless system, and the first wireless system is configured with a first interframe space duration, the method comprising:

sensing a wireless medium;

Determine whether the wireless medium is occupied by the first wireless system or occupied by the second wireless system;

when the wireless medium is occupied by the first wireless system, determine the interframe space duration corresponding to the wireless device to be shorter than the second interframe space duration, When the wireless medium is occupied by the second wireless system, Determine the interframe space duration corresponding to the wireless device to be equal to the second interframe space duration, and transmitting a data frame of the wireless device after the wireless medium is idle for at least the interframe space duration, wherein the data frame complies with the standard corresponding to the second wireless system.

2. The method of claim 1, wherein the step of determining the interframe space duration of the wireless device when the wireless medium is busy comprises:

determining the interframe space duration of the wireless device to be the first interframe space duration when the wireless medium is occupied by the first wireless system;

wherein the first interframe space duration is shorter than the second interframe space duration.

3. The method of claim 1, wherein the interframe space duration comprises a short interframe space (SIFS) and a plurality of slot times.

4. The method of claim 3, wherein the step of determining the interframe space duration of the wireless device when the wireless medium is busy comprises:

determining the SIFS of the wireless device to be a first SIFS corresponding to the first wireless system when the wireless medium is occupied by the first wireless system.

5. The method of claim 3, wherein the step of determining the interframe space duration of the wireless device when the wireless medium is busy comprises:

determining the slot time of the wireless device to be a first slot time corresponding to the first wireless system when the wireless medium is occupied by the first wireless system.

6. The method of claim 1, further comprising: determining the interframe space duration of the wireless device to be equal to the second interframe space duration when the wireless medium is occupied by the second wireless system.

7. The method of claim 1, wherein the first wireless system and the second wireless system are under a distributed coordination function protocol (DCF), and the interframe space duration, the first interframe space duration and the second interframe space duration are a DCF interframe space (DIFS), a first DIFS and a second DIFS, respectively.

8. The method of claim 1, wherein the first wireless system operates within a first bandwidth, the second wireless system operates within a second bandwidth, and the second bandwidth is narrower than the first bandwidth.

9. The method of claim 1, wherein the first wireless system complies with one of IEEE 802.11a/b/g/n/ac and the second wireless system complies with IEEE 802.11j, and the standard is IEEE 802.11j.

10. The method of claim 1, wherein the transmitting step comprises, transmitting a data frame of the wireless device after the wireless medium is idle for the interframe space duration plus a backoff period.

11. A wireless device, configured to enhance a transmission opportunity, wherein the wireless device communicates with a second wireless system and attempts to interoperate with a first wireless system, and the first wireless system is configured with a first interframe space duration, the wireless device comprising:

a processing unit; and a storage unit, coupled to the processing unit, configured to store a program code, the program code instructing the processing unit to perform following steps:

sensing a wireless medium;

Determine whether the wireless medium is occupied by the first wireless system or occupied by the second wireless system;

when the wireless medium is occupied by the first wireless system, determine the interframe space duration corresponding to the wireless device to be shorter than the second interframe space duration, When the wireless medium is occupied by the second wireless system, Determine the interframe space duration corresponding to the wireless device to be equal to the second interframe space duration, and transmitting a data frame of the wireless device after the wireless medium is idle for at least the interframe space duration, wherein the data frame complies with the standard corresponding to the second wireless system.

12. The wireless device of claim 11, wherein the program code further instructs the processing unit to determine the interframe space duration of the wireless device to be the first interframe space duration when the wireless medium is occupied by the first wireless system;

wherein the first interframe space duration is shorter than the second interframe space duration.

13. The wireless device of claim 11, wherein the interframe space duration comprises a short interframe space (SIFS) and a plurality of slot times.

14. The wireless device of claim 13, wherein the program code further instructs the processing unit to determine the SIFS of the wireless device to be a first SIFS corresponding to the first wireless system when the wireless medium is occupied by the first wireless system.

15. The wireless device of claim 13, wherein the program code further instructs the processing unit to determine the slot time of the wireless device to be a first slot time corresponding to the first wireless system when the wireless medium is occupied by the first wireless system.

16. The wireless device of claim 11, wherein the program code further instructs the processing unit to determine the interframe space duration of the wireless device to be equal to the second interframe space duration when the wireless medium is occupied by the second wireless system.

17. The wireless device of claim 11, wherein the first wireless system and the second wireless system are under a distributed coordination function protocol (DCF), and the interframe space duration, the first interframe space duration and the second interframe space duration are a DCF interframe space (DIFS), a first DIFS and a second DIFS, respectively.

18. The wireless device of claim 11, wherein the first wireless system operates within a first bandwidth, the second wireless system operates within a second bandwidth, and the second bandwidth is narrower than the first bandwidth.

19. The method of claim 11, wherein the first wireless system complies with one of IEEE 802.11a/b/g/n/ac and the second wireless system complies with IEEE 802.11j, and the standard is IEEE 802.11j.

20. The method of claim 11, wherein the transmitting step comprises, transmitting a data frame of the wireless device after the wireless medium is idle for the interframe space duration plus a backoff period.

\* \* \* \* \*